US012260667B1

United States Patent
Choi et al.

(10) Patent No.: US 12,260,667 B1
(45) Date of Patent: Mar. 25, 2025

(54) ROBOT FOR IDENTIFYING PERSON TO BE RESCUED WITHIN SPACE WHEN EMERGENCY SITUATION OCCURS AND METHOD OF CONTROLLING THE ROBOT

(71) Applicant: CORNERS CO., LTD., Seoul (KR)

(72) Inventors: Jang Won Choi, Seoul (KR); Dong Oh Kim, Seoul (KR); Tae Kyu Han, Seoul (KR)

(73) Assignee: CORNERS CO., LTD., Seoul (KR)

( * ) Notice: Subject to any disclaimer, the term of this patent is extended or adjusted under 35 U.S.C. 154(b) by 0 days.

(21) Appl. No.: 18/823,530

(22) Filed: Sep. 3, 2024

(51) Int. Cl.
| | |
|---|---|
| G06V 40/10 | (2022.01) |
| G06T 7/55 | (2017.01) |
| G06T 15/10 | (2011.01) |
| G06T 17/00 | (2006.01) |
| G06T 19/20 | (2011.01) |
| G06V 10/25 | (2022.01) |
| G06V 10/44 | (2022.01) |
| G06V 10/75 | (2022.01) |
| G06V 20/56 | (2022.01) |

(52) U.S. Cl.
CPC ............... *G06V 40/10* (2022.01); *G06T 7/55* (2017.01); *G06T 15/10* (2013.01); *G06T 17/00* (2013.01); *G06T 19/20* (2013.01); *G06V 10/25* (2022.01); *G06V 10/44* (2022.01); *G06V 10/757* (2022.01); *G06V 20/56* (2022.01); G06T 2207/30196 (2013.01); G06T 2207/30252 (2013.01); G06T 2219/2004 (2013.01)

(58) Field of Classification Search
None
See application file for complete search history.

(56) References Cited

U.S. PATENT DOCUMENTS

| | | | | |
|---|---|---|---|---|
| 11,783,592 B2* | 10/2023 | Nakagawa | ............. | G06V 20/56 382/181 |
| 2006/0039587 A1* | 2/2006 | Yoon | .................... | G06V 40/162 382/115 |
| 2018/0316628 A1* | 11/2018 | Dey | ........................ | B25J 9/1661 |
| 2019/0377355 A1* | 12/2019 | Kwak | .................. | G05D 1/0214 |

(Continued)

FOREIGN PATENT DOCUMENTS

| | | |
|---|---|---|
| KR | 10-2005-0024840 | 3/2005 |
| KR | 10-1307045 | 9/2013 |

(Continued)

OTHER PUBLICATIONS

Hongsheng et al., "A Deep Learning and Depth Image based Obstacle Detection and Distance Measurement Method for Substation Patrol Robot" (Year: 2020).*

(Continued)

*Primary Examiner* — Hilina K Demeter
(74) *Attorney, Agent, or Firm* — Christensen O'Connor Johnson Kindness PLLC

(57) ABSTRACT

There is provided a method of controlling a robot, which is performed by the robot that travels within a space. The robot identifies a person to be rescued, among persons within a space, by using a camera while travelling within the space, determines a distance between the robot and the person to be rescued based on depth information that is obtained by the camera and that is associated with the person to be rescued, and transmits information including the determined distance to a control server for the space.

16 Claims, 13 Drawing Sheets

(56) References Cited

U.S. PATENT DOCUMENTS

| | | | | |
|---|---|---|---|---|
| 2021/0271866 A1* | 9/2021 | Hayakawa | ............. | G06V 20/41 |
| 2023/0057965 A1* | 2/2023 | Peng | ........................ | A47L 9/00 |
| 2023/0138192 A1* | 5/2023 | Wang | ..................... | G16H 40/63 |
| | | | | 705/2 |
| 2023/0213944 A1* | 7/2023 | Baik | ......................... | G06T 7/50 |
| | | | | 701/28 |
| 2023/0333570 A1* | 10/2023 | Frederick | ............... | G05D 1/249 |
| 2024/0304097 A1* | 9/2024 | Madden | ............... | G08G 1/0955 |

FOREIGN PATENT DOCUMENTS

| | | |
|---|---|---|
| KR | 10-2018-0088305 | 8/2018 |
| KR | 10-2023-0152866 | 11/2023 |

OTHER PUBLICATIONS

Kim, D.-H., et al, "Deep Learning Based Rescue Requesters Detection Algorithm for Physical Security in Disaster Sites," Journal of Internet Computing and Services 23(4):57-64, Aug. 2022. http://dx.doi.org/10.7472/jksii.2022.23.4.57.

Decision to Grant mailed Jun. 27, 2024, issued in corresponding Korean Patent Application No. 10-2024-0039305, filed Mar. 21, 2024, 7 pages.

Written Opinion mailed May 22, 2024, issued in corresponding Korean Patent Application No. 10-2024-0039305, filed Mar. 21, 2024, 10 pages.

* cited by examiner

1200

1300

ROBOT FOR IDENTIFYING PERSON TO BE RESCUED WITHIN SPACE WHEN EMERGENCY SITUATION OCCURS AND METHOD OF CONTROLLING THE ROBOT

CROSS-REFERENCE TO RELATED APPLICATION

This application is based on and claims priority under 35 U.S.C. 119 to Korean Patent Application No. 10-2024-0039305, filed on Mar. 21, 2024, in the Korean intellectual property office, the disclosures of which are herein incorporated by reference in their entireties.

TECHNICAL FIELD

Embodiments relate to a method of controlling a robot so that the robot identifies a person to be rescued, among people (i.e., persons) within a space when an emergency situation occurs in the space, and a control server that communicates with the robot.

BACKGROUND OF THE DISCLOSURE

When an emergency situation occurs in an indoor or outdoor space, it is important to rapidly check a person to be actually rescued, among persons within the space. In particular, if urgent first aid is required for a person to be rescued, it is necessary to rapidly recognize the person to be rescued differently from other persons within a space and to take appropriate measures on the person to be rescued.

In order to identify a person to be rescued within a space, a robot that travels within the space may be used. The robot may recognize objects including persons within the space while autonomously travelling within the space, and may identify a person to be rescued, among the recognized persons.

A robot that autonomously travels within a space may identify persons or other obstacles that are present in the space, based on vision recognition. In operating such robots within a space, it is necessary to accurately separately identify a person to be substantially rescued and persons who do not need to be rescued within the space.

Korean Patent Application Publication No. 10-2005-0024840 is a technology relating to a path planning method for an autonomous mobile robot, and discloses a method of planning an optimal path along which a mobile robot that autonomously moves in a home or office can move up to a target point safely and rapidly while avoiding obstacles.

The aforementioned information is to merely help understanding, and may include contents which do not form a part of a conventional technology.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An embodiment may provide a method of controlling a robot so that the robot that autonomously travels within a space can identify a person to be rescued by using the camera of the robot and determine a distance between the robot and the person to be rescued based on depth information that is associated with the person to be rescued and that is obtained by the camera.

An embodiment may provide a method of providing information, which allows a distance between a person to be rescued who is identified within a space and the robot to be transmitted to a control server and the person to be rescued and the robot to be displayed in a three-dimensional (3-D) model of the space.

An embodiment may provide a method of controlling a robot so that the robot can determine whether a corresponding person corresponds to a person to be rescued by determining a posture of a recognized person through the camera of the robot, determine a distance between the robot and the person to be rescued based on depth information that is obtained by the camera, and transmit the distance to the control server.

In an aspect, there is provided a method of controlling a robot. The method is performed by the robot that travels within a space, and includes identifying a person to be rescued, among persons within the space, by using a camera of the robot while travelling within the space, determining a distance between the robot and the person to be rescued based on depth information that is obtained by the camera and that is associated with the person to be rescued, and transmitting information including the distance to a control server for the space.

The camera may include an RGBD camera.

The identifying of the person to be rescued may include identifying a first person within the space by using the camera, determining a posture of the first person, and determining the first person as the person to be rescued when the posture of the first person corresponds to a first posture that requires rescue.

The determining of the posture of the first person may include obtaining a bounding box and a plurality of key points corresponding to the first person from a first image that is captured by the camera, and determining whether the first posture corresponds to the first person based on at least one of a shape of the bounding box and an arrangement pattern of the key points.

The determining of whether the first posture corresponding to the first person may include determining that the first person corresponds to the first posture when the shape of the bounding box is a rectangular shape having a width greater than a height or a ratio of a horizontal length to vertical length of the bounding box is a predetermined value or more.

The determining of whether the first posture corresponds to the first person may include determining that the first posture corresponds to the first person, when the key points indicate an arrangement pattern in which first key points corresponding to an upper body area of the first person, among the key points, are disposed at locations identical with or lower than locations of second key points corresponding to a lower body area of the first person from a ground.

The determining of whether the first posture corresponds to the first person may include determining that the first person corresponds to the first posture, when heights of first key points corresponds to an upper body area of the first person from a ground is a predetermined value or less.

The determining of the posture of the first person may include matching the plurality of key points with a second image including the depth information obtained by the camera and removing an outlier from the plurality of key points matched with the second image. Key points from which the outlier has been removed, among the plurality of key points, may be used to determine whether the first person corresponds to the first posture.

The determining of the distance may include obtaining a plurality of key points corresponding to the person to be rescued from a first image that is captured by the camera, matching the plurality of key points with a second image including the depth information that is obtained by the camera, and determining the distance based on depth information associated with the plurality of key points matched with the second image.

The determining of the distance based on the depth information may include removing an outlier from the plurality of key points matched with the second image. Key points from which the outlier has been removed, among the plurality of key points, may be used to determine the distance.

The determining of the distance may include determining the distance based on an average value of distances between the plurality of key points and the robot.

The first image may haves first resolution. The second image may have second resolution. The matching of the plurality of key points with the second image may include converting the coordinates of each of the plurality of key points into coordinates in the second image based on the first resolution and the second resolution.

The determining of the distance based on the depth information may include determining the distance based on an average value of distances between the coordinates in the second image, which have been converted from the plurality of key points, and the robot.

The method may further include periodically transmitting a location of the robot to the control server. The control server may display the received location of the robot in a three-dimensional (3-D) model of the space, and may further display the person to be rescued based on the received location of the robot and the received distance.

The 3-D model may constitute digital twin content corresponding to the space. The digital twin content may include at least a first 3-D object that corresponds to the robot and into which a movement of the robot is incorporated and a second 3-D object corresponding to the person to be rescued.

In another aspect, there is provided a robot that travels within a space. The robot includes at least one processor configured to execute a computer-readable instruction, a communication unit, and a camera. The at least one processor identifies a person to be rescued, among persons within the space, by using the camera while travelling within the space, determines a distance between the robot and the person to be rescued based on depth information that is obtained by the camera and that is associated with the person to be rescued, and transmits information including the distance to a control server for the space through the communication unit.

In still another aspect, there is provided a method of providing information on a person to be rescued within a space. The method is performed by a control server that communicates with at least one robot that travels within the space and includes periodically receiving a location of the at least one robot from the robot that travels within the space, receiving, from the robot, information including a distance between the robot and the person to be rescued as information on the person to be rescued, which is identified by using a camera of the robot, and displaying the robot and the person to be rescued in a three-dimensional (3-D) model of the space based on the received location of the robot and the received information. The person to be rescued is a person identified by the camera of the robot, among persons within the space. The distance is determined based on depth information that is obtained by the camera and that is associated with the person to be rescued.

The 3-D model may constitute digital twin content corresponding to the space. The digital twin content may include at least a first 3-D object that corresponds to the robot and into which a movement of the robot is incorporated and a second 3-D object corresponding to the person to be rescued.

The digital twin content may be configured to further display an area corresponding to a view angle of the camera of the robot in association with the robot.

The robot that autonomously travels within a space can identify a person to be rescued by using the RGBD camera and determine a distance between the robot and the person to be rescued based on depth information, although the robot does not include expensive equipment, such as a LIDAR sensor.

The control server can generate digital twin content in which 3-D objects corresponding to the robot and a person to be rescued are displayed in the 3-D model of a space because distance information for the person to be rescued, which is determined by the robot, and location information (and direction information) of the robot are transmitted to the control server.

It is possible to determine whether a person corresponds to a person to be rescued because a posture of the person is determined by analyzing key points corresponding to the person based on an RGB image and a depth image that are captured by the camera of the robot.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
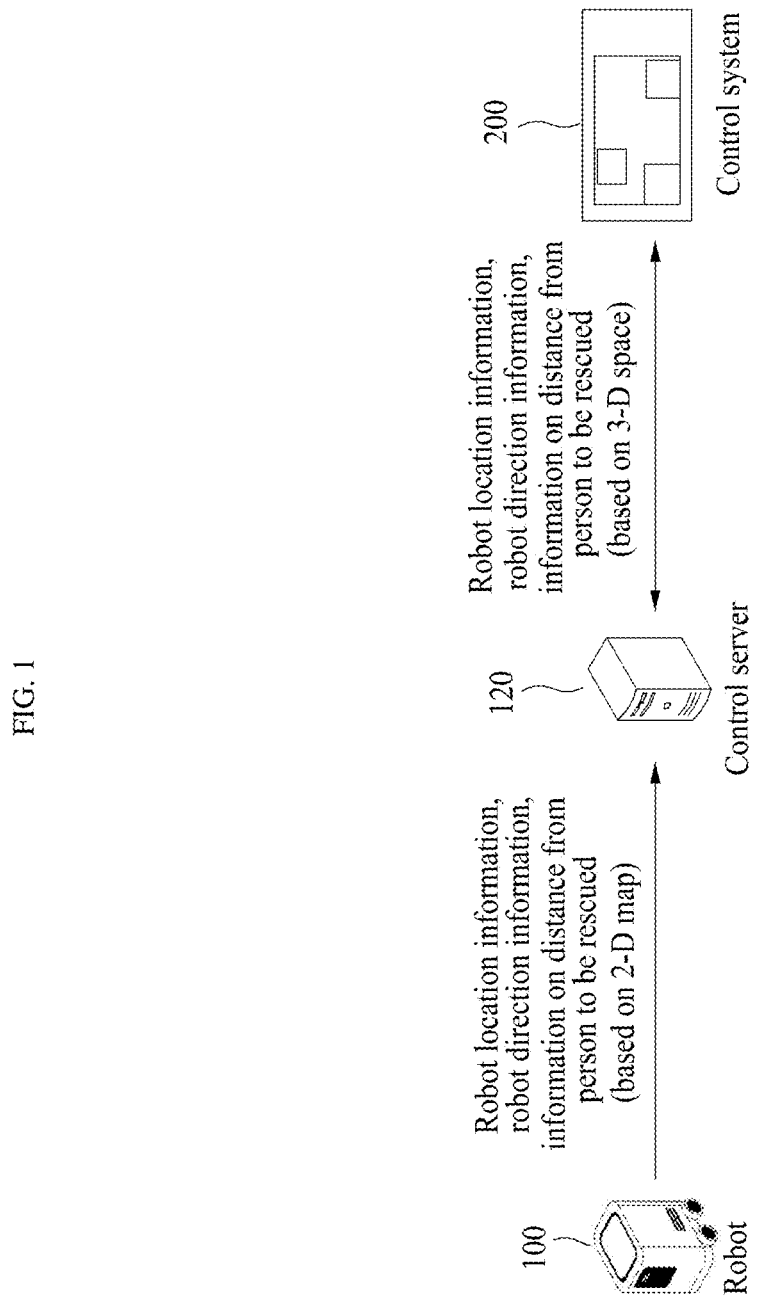
FIG. 1 illustrates a method of transmitting location information (and direction information) of a robot that autonomously travels within a space and distance information of a person to be rescued to a control server and generating control service information indicative of the robot and the person to be rescued, according to communication between the robot and the control server, according to an embodiment.

While illustrative embodiments have been illustrated and described, it will be appreciated that various changes can be made therein without departing from the spirit and scope of the disclosure.

Hereinafter, embodiments are described in detail with reference to the accompanying drawings. The same reference numeral that is presented in each drawing denotes the same member.

FIG. 1 illustrates a method of transmitting location information (and direction information) of a robot that autonomously travels within a space and distance information of a person to be rescued to a control server and generating control service information indicative of the robot and the person to be rescued, according to communication between the robot and the control server, according to an embodiment.

FIG. 1 illustrates a robot 100 that travels within a predetermined space and a control server 120 that communicates with the robot 100. The robot 100 may be controlled by autonomously generating a control command based on information and/or data that is received from the control server 120 or another server (e.g., a cloud server, hereinafter a robot control system) including a separate robot control system, or may be controlled by receiving a control command from the control server 120 or the robot control system.

The space may indicate an indoor space and/or an outdoor space. In other words, the space may be an indoor or outdoor space the range of which has been specified, or may be a space including both indoor and outdoor spaces.

The robot 100 may be a service robot that provides services to a person within a space, in the space such as the interior of a building, for example. For example, the robot 100 may be a service robot that provides directions that provide the person with guidance to a specific location within a space, or may be a service robot configured to provide other information (e.g., evacuation information) to a person within a space.

The robot 100 may recognize persons within a space by using a camera while autonomously travelling within the space, and may provide the recognized persons with information, such as a direction service.

In an embodiment, the robot 100 may transmit its location (i.e., location information) to the control server 120 while autonomously travelling within a space. In this case, the robot 100 may periodically transmit its location (i.e., location information) to the control server 120. Furthermore, the robot 100 may transmit its direction (i.e., direction information or posture information) to the control server 120 while autonomously travelling within the space. In this case, the robot 100 may periodically transmit its direction (i.e., direction information or posture information) to the control server 120. For example, the robot 100 may periodically transmit, to the control server 120, various types of sensor information related to the posture of the robot 100 or information (e.g., rotation information and camera parameters of a camera) related to control of the camera.

Furthermore, the robot 100 may recognize persons by using the camera, and may identify a person to be rescued, among the recognized persons. The robot 100 may determine a distance between the robot and the identified person and transmit the determined distance (i.e., distance information) to the control server 120.

The robot 100 may autonomously travel within a space on a permanent basis. However, according to an embodiment, the robot 100 may be configured to travel within a space only when an emergency situation occurs. That is, the robot 100 may be configured to search and travel within the space by receiving a command from the control server 120 or the robot control system when an emergency situation occurs.

The control server 120 may be configured to receive location information (and direction information) and distance information from the robot 100 through communication with the robot 100. The control server 120 may monitor an emergency situation or the occurrence of an accident within a space. In an embodiment, the control server 120 may obtain a three-dimensional (3-D) model of a space in which the robot 100 travels. The 3-D model is obtained by modeling the space in a 3-D way, and may be a 3-D map of the space. The control server 120 may be included in the robot control system according to an embodiment or may also play a role as the robot control system.

The control server 120 may display the robot 100 and the person to be rescued in the 3-D model based on the location information (and direction information) and the distance information that are received from the robot 100. For example, the control server 120 may display the robot 100 and the person to be rescued in the 3-D model by converting the received location information (and direction information) and distance information into coordinates in the 3-D model. The control server 120 may track a movement of the robot 100 based on the 3-D model, and may generate digital twin content including a 3-D object corresponding to the robot 100 and a 3-D object corresponding to the person to be rescued. The digital twin content imitates the space in which the robot 100 travels, and may represent objects (including the robot 100 and an identified person to be rescued) within a space as 3-D objects.

The control server 120 may transmit the generated digital twin content (or a 3-D model in which the robot 100 and the person to be rescued are indicated) to a control system 200.

In other words, the control server 120 may render the digital twin content (or 3-D model) for a display or output in the control system 200. The control system 200 is an apparatus for displaying the digital twin content (or 3-D model) that is generated by the control server 120, and may be a user/manager terminal. The user/manager terminal is a computing device, and may include a PC, a laptop, a smartphone, a tablet, an Internet of things (IoT) device, or a wearable computer, for example. The control system 200 may include software capable of displaying digital twin content, and may display the location (i.e., a current location or a real-time location) of the robot 100 and the location of a person to be rescued in the digital twin content. Furthermore, the direction (i.e., a direction or posture in which the robot 100 is currently directed) of the robot 100 may be displayed in the digital twin content. Accordingly, a location relation between the robot 100 and the person to be rescued may be defined in the digital twin content.

According to an embodiment, the control system 200 may be configured to obtain the 3-D model of the space by receiving the location information (and direction information) of the robot 100 and the distance information related to the person to be rescued, from the control server 120, and to display the robot 100 and the person to be rescued in the 3-D model. In other words, the control system 200 may be configured to generate the digital twin content.

A camera included in the robot 100 may be an RGBD camera. Accordingly, in an embodiment, the robot 100 can accurately identify a person to be rescued, among persons who are recognized within a space, even without using expensive equipment such as a LIDAR sensor, and can accurately determine a distance between the robot and the person to be rescued. Furthermore, as information on the checked distance between the robot and the person to be rescued is transmitted to the control server 120, the distance information may be displayed in digital twin content corresponding to the space. However, the robot 100 according to an embodiment may be configured to include LIDAR (or a LIDAR sensor). In this case, the aforementioned distance information may be obtained by using LIDAR.

A more detailed method of the robot 100 being controlled to identify a person to be rescued, among persons who are recognized within a space, and to determine a distance between the robot and the person to be rescued is described more specifically with reference to FIGS. 2 to 11.

Figure 2:
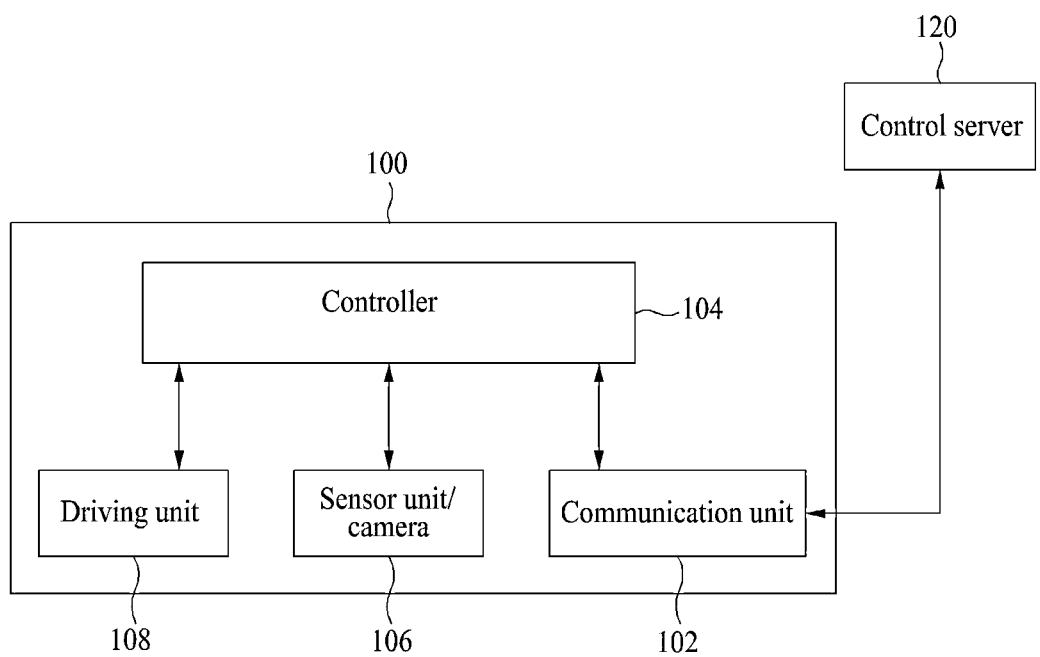
FIG. 2 is a block diagram illustrating the robot that autonomously travels within a space according to an embodiment.

FIG. 2 is a block diagram illustrating the robot that autonomously travels within a space according to an embodiment.

As described above, the robot 100 may be a moving body configured to identify a person to be rescued within a space by using the camera and to determine a distance between the robot and the person to be rescued.

The robot 100 may be a physical device. As illustrated in FIG. 2, the robot 100 may include a controller 104, a driving unit 108, a sensor unit 106, and a communication unit 102.

The controller 104 may be a physical processor embedded in the robot 100, and may selectively include at least one of a module for path plan processing, a module for mapping processing, a module for driving control, a module for localization processing, a module for data processing, and a module for service processing. At least one of the modules may be selectively included in the controller 104 according to an embodiment so that the robot 100 can autonomously travel although communication between the robot control system or the control server 120 and the robot 100 is not performed.

The communication unit 102 may be a component that enables the robot 100 to communicate with another device (e.g., another robot or the control server 120). In other words, the communication unit 102 may be a hardware module, such as an antenna of the robot 100, a data bus, a network interface card, a network interface chip, or a networking interface port, or a software module, such as a network device driver or a networking program, which transmits/receives data and/or information to/from another device.

The driving unit 108 is a component that controls a movement of the robot 100 and that enables the robot 100 to move, and may include equipment for performing the control. For example, the driving unit 108 may include a wheel and a motor.

The sensor unit 106 may be a component for collecting data that are required for the autonomous travelling of the robot 100 and the provision of a service. The sensor unit 106 may include expensive sensing equipment (or scan equipment), or may include only a sensor, such as a cheap ultrasonic sensor and/or a cheap camera. The sensor unit 106 may include a sensor for identifying obstacles/persons placed in a driving direction thereof. Furthermore, the sensor unit 106 may include a camera. The camera may be disposed to recognize persons who are placed around the robot 100. The camera may include an RGBD camera. Alternatively, the camera may include an RGB camera and a depth camera. The robot 100 (or the robot control system) may determine a location relation between a recognized person (or person to be rescued) and the robot 100 based on depth information that is obtained by the camera. That is, the camera capable of obtaining depth information in an embodiment may be used to measure a distance between a person and the robot 100 by recognizing the person.

As a processing example of the controller 104, the controller 104 may control the robot 100 based on a map of a space, which is obtained from the robot control system (or the control server 120 according to an embodiment), or a moving path for the space. The controller 104 may receive such information from the robot control system through the communication unit 102, and may control the autonomous travelling of the robot 100 by controlling the driving unit 108.

The robot 100 may have its travelling controlled by using a map (i.e., a map in the robot control system) of a space, which is stored in a cloud, or a map that is downloaded and stored from the robot control system. Furthermore, control, such as moving to a destination or avoiding obstacles according to a global path plan and/or a local path plan through a navigation algorithm installed in the robot, may be performed on the robot 100. The map of the space may be a map in which an area of a space in which the robot 100 can travel is indicated as a scale, for example. Alternatively, the map of the space is a map that is generated through 3-D scanning for a space, and may be a map that is constructed based on point cloud data or that is constructed based on the 3-D model of a space, which has been previously modeled, for example. The type of map of the space is not specially limited.

Furthermore, although not illustrated, the robot 100 may further include a speaker and/or a display, or an LED (hereinafter an indicator output unit) for providing information/content. The robot 100 may output visual and/or auditory information to a person within a space through the indicator output unit.

The control server 120 that communicates with the robot 100 may include at least one computing device, and may be disposed inside or outside a space. As described above, the control server 120 may be configured to communicate with the robot 100 and to receive the location information (and direction information) and the distance information from the robot 100, and may generate digital twin content (corresponding to a space) in which the robot 100 and a person to be rescued are displayed in the 3-D model of the space based on the received information.

Although not illustrated, the control server 120 is a computing device, and may include memory, a processor, a communication unit, and an input and output interface, and thus a redundant description thereof is omitted. An operation of the control server 120 is described more specifically with reference to FIG. 6.

The technical characteristics described above with reference to FIG. 1 may also be applied to FIG. 2 without any change, and thus a redundant description thereof is omitted.

In a detailed description to be given later, an operation that is performed by the robot 100, the robot control system not illustrated, or the components of the control server 120 may be described as an operation that is performed by the robot 100, the robot control system, or the control server 120, for convenience of description.

Furthermore, in the detailed description to be given later, at least some of steps and at least some of operations, which are described as being performed by the robot 100, may be performed by the robot control system (or the control server 120 that may also play a role as the robot control system), and vice versa, and thus a redundant description thereof is omitted.

Figure 3:
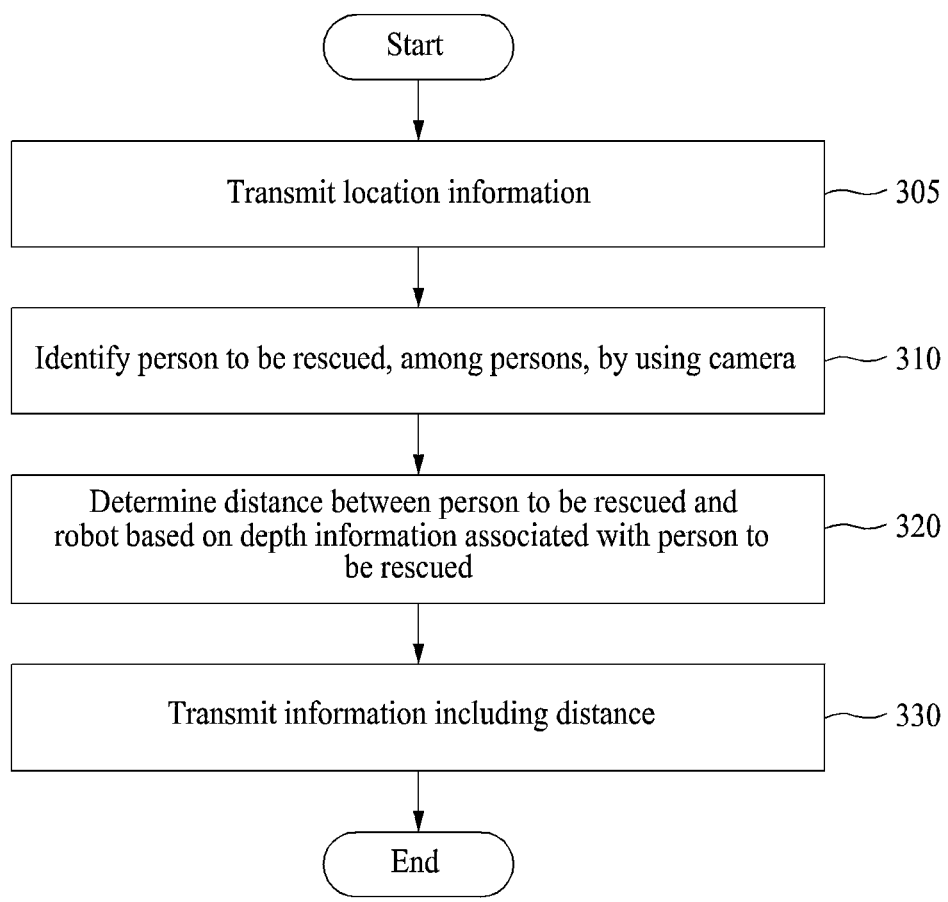
FIG. 3 is a flowchart illustrating a method of controlling the robot that autonomously travels within a space so that the robot identifies a person to be rescued, among persons within the space, based on information that is obtained by the camera of the robot and determines a distance between the robot and the person to be rescued, according to an embodiment.

FIG. 3 is a flowchart illustrating a method of controlling the robot that autonomously travels within a space so that the robot identifies a person to be rescued, among persons within the space, based on information that is obtained by the camera of the robot and determines a distance between the robot and the person to be rescued, according to an embodiment.

The method of controlling the robot 100, which is performed by the robot that travels within a space, is described with reference to FIG. 3.

Hereinafter, embodiments are described centering around the robot 100, but an operation or an arithmetic operation for identifying a person to be rescued and determining a distance between the person to be rescued and the robot 100, which will be described later, may be performed by the robot control system rather than the robot 100.

In step 310, the robot 100 may identify a person to be rescued, among persons within a space, by using the camera of the robot 100 while travelling within a space. The robot 100 may identify persons within the range of the view angle of the camera based on vision recognition algorithm (e.g., an AI-based vision recognition algorithm), with respect to an image captured by the camera. The robot 100 may recognize a person differently from a different type of an object by analyzing the image captured by the camera by using the vision recognition algorithm. The robot 100 may identify a person to be rescued, among the persons who are recognized in the image. The person to be rescued may be a person who lies down, a person who is determined to be unconscious (i.e., a stopped person), or a person who takes a specific posture, for example. A detailed method of the robot 100 identifying the person to be rescued is described more specifically with reference to FIG. 4.

In step 320, the robot 100 may determine a distance between the person to be rescued and the robot 100, based on depth information that is obtained by the camera and that is associated with the person identified in step 310. For example, the robot 100 may determine the distance between the person to be rescued and the robot 100 based on depth values of points corresponding to the person to be rescued. A detailed method of the robot 100 determining the distance between the person to be rescued and the robot is described more specifically with reference to FIG. 5.

In step 330, the robot 100 may transmit information, including the distance determined in step 320, to the control server 120 for the space in which the robot 100 travels.

As illustrated in FIG. 3, in step 305, the robot 100 may transmit its location to the control server 120. For example, the robot 100 may periodically transmit its location (and direction). The distance and location (i.e., the aforementioned distance information and location information) (and the aforementioned direction information) that are transmitted to the control server 120 may be used to generate digital twin content corresponding to the space. The control server 120 may obtain the 3-D model of the space, may display the received location of the robot 100 in the 3-D model of the space, and may further display the person to be rescued based on the received location (and direction) of the robot 100 and the received distance (between the person to be rescued and the robot). That is, the control server 120 may display the robot 100 and the person to be rescued at each corresponding location in the 3-D model because the control server 120 is aware of the location (and direction) of the robot 100 that is periodically obtained and the distance between the robot 100 and the person to be rescued.

The control server 120 may generate the digital twin content corresponding to the space. The 3-D model may constitute the digital twin content. The generated digital twin content may include at least a first 3-D object that corresponds to the robot 100 and into which a movement of the robot 100 is incorporated and a second 3-D object corresponding to the identified person. The generated digital twin content may be rendered displayed in the control system 200 (or a manager/user terminal). The first 3-D object may be displayed in the digital twin content by incorporating an identified posture of the robot 100. The second 3-D object may also be displayed in the digital twin content by incorporating an identified posture of the person to be rescued. A detailed example of the digital twin content is described more specifically with reference to FIG. 11.

The technical characteristics described above with reference to FIGS. 1 and 2 may also be applied to FIG. 3 without any change, and thus a redundant description thereof is omitted.

Figure 4:
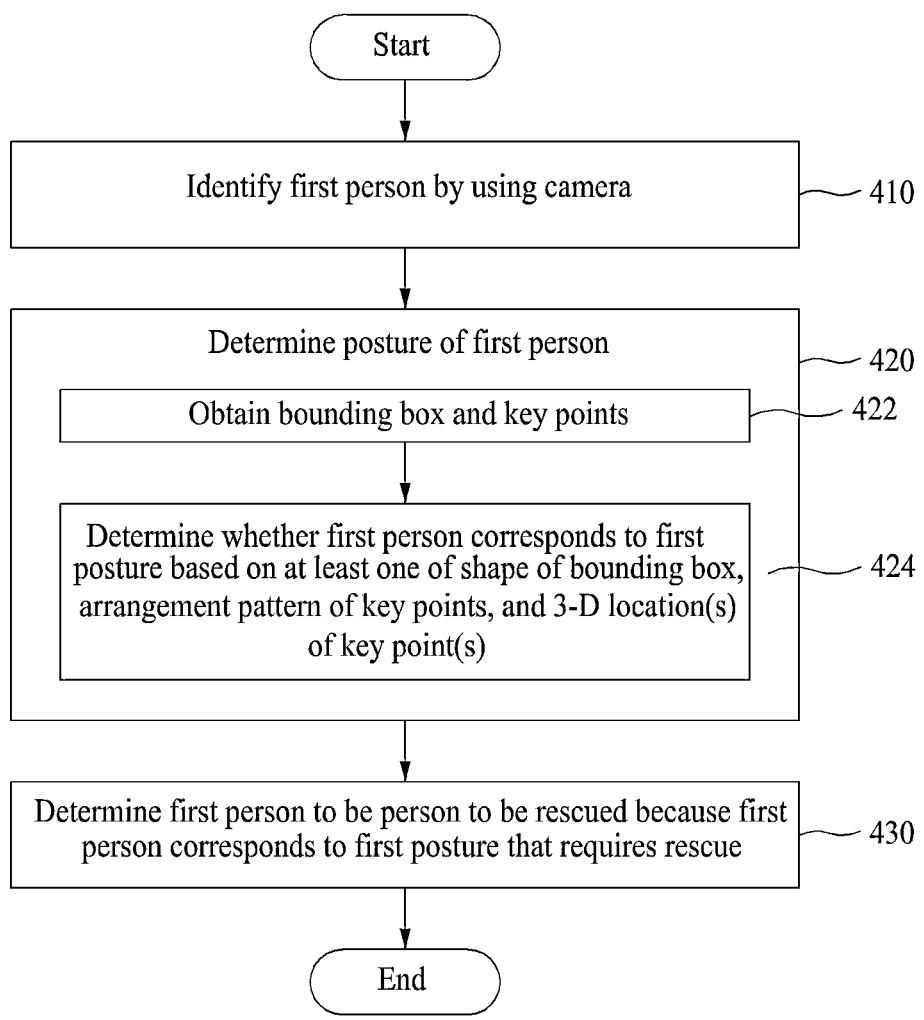
FIG. 4 is a flowchart illustrating a method of identifying a person to be rescued, among persons within a space, based on information that is obtained by the camera of the robot that autonomously travels within a space, according to an example.

FIG. 4 is a flowchart illustrating a method of identifying a person to be rescued, among persons within a space, based on information that is obtained by the camera of the robot that autonomously travels within a space, according to an example.

A method of identifying a person to be rescued, among persons within a space, by using the camera of the robot 100, which has been described in step 310 of FIG. 3, is described more specifically with reference to FIG. 4. Steps 410 to 430 of FIG. 4 may be included in step 310.

In step 410, the robot 100 may identify a first person within a space by using the camera. That is, the robot 100 may identify the first person who is present within an image captured by the camera, by analyzing the image. In identifying a person in an image, an AI-based vision recognition algorithm may be used. For example, a vision recognition algorithm "YOLO" may be used as the vision recognition algorithm. Furthermore, the robot 100 may determine a bounding box corresponding to the first person within the image captured by the camera.

In step 420, the robot 100 may determine a posture of the identified first person. The robot 100 may determine the posture of the first person in order determine whether the first person corresponds to a person to be rescued.

In order to determine the posture of the first person, in step 422, the robot 100 may obtain a bounding box and a plurality of key points corresponding to the first person from the image captured by using the camera. For example, the robot 100 may obtain the bounding box and the plurality of key points corresponding to the first person from an RGB image, that is, a first image captured by the camera. For example, the robot 100 may obtain the bounding box corresponding to the first person from the first image by using the YOLO algorithm, and may obtain (i.e., extract) the key points corresponding to the first person from the first image by using an OpenPose algorithm. The key points may indicate points corresponding to body parts of the first person.

The obtained bounding box and key points may be used to determine the posture of the first person.

In step 424, the robot 100 may determine whether the first person corresponds to a first posture based on at least one of conditions i) a shape of the bounding box corresponding to the first person, ii) an arrangement pattern of the key points corresponding to the first person, and iii) 3-D locations of the key points corresponding to the first person.

In this case, the first posture is a posture that requires rescue, and may indicate the state in which the first person falls and lies down or a posture in an unconscious state, for example.

When the posture of the first person corresponds to the first posture that requires rescue, in step 430, the robot 100 may determine the first person to be a person to be rescued. Accordingly, the person to be rescued can be identified.

A method of determining whether the first person corresponds to the first posture in step 424 is described more specifically.

In relation to the condition i), when the shape of the bounding box corresponding to the first person is a rectangular shape having a width greater than a height or the ratio of a horizontal length to vertical length of the bounding box is a predetermined value or more, the robot 100 may determine that the first person corresponds to the first posture that requires rescue. That is, when the shape of the bounding box corresponding to the first person is a rectangular shape having the width greater than the height or the ratio of the horizontal length to vertical length of the bounding box is a predetermined value or more, it may be predicted that the first person lies down and it may be determined that the first person requires rescue.

In relation to the condition ii), when the key points corresponding to the first person indicate an arrangement pattern in which first key points corresponding to an upper body area (e.g., a head area) of the first person, among the key points corresponding to the first person, are disposed at locations identical with or lower than the locations of second key points corresponding to a lower body area (or the remaining area except the head area) of the first person, among the key points corresponding to the first person, from the ground, the robot 100 may determine the first person corresponds to the first posture. That is, when the key points corresponding to the first person indicate the arrangement pattern, it may be predicted the first person lies down or is unconscious. Accordingly, it may be determined that the first person requires rescue. To which area or part of the first person does the key points belong may be determined by using the OpenPose algorithm, for example. A comparison between the first key points and the second key points may be a comparison between average values of the first and second key points. In other words, the aforementioned arrangement pattern may be determined based on a comparison between an average value (or representative value) of the first key points and an average value (or representative value) of the second key points.

In relation to the condition iii), when the heights of the first key points corresponding to the upper body area (or head area) of the first person from the ground are a predetermined value or less, the robot 100 may determine that the first person corresponds to the first posture that requires rescue. That is, when the absolute heights of the first key points of the first person in a 3-D space are the predetermined value or less, it may be predicted that the first person lies down or is unconscious. Accordingly, it may be determined that the first person requires rescue. For example, although the shape of the bounding box corresponding to the first person is not the rectangular having the width greater than the height, when the condition iii) is satisfied, it may be determined that the first person takes the first posture that requires rescue (because the head or the upper body is placed at a low place by a predetermined value). Likewise, in the condition ii), to which area or part of the first person does the key points belong may be determined by using the OpenPose algorithm, for example. Whether the heights of the first key points are a predetermined value or less may be determined based on an average value (i.e., average height) (or representative value) of the first key points.

That is, when all of the conditions i) to iii) are satisfied or any one of the conditions i) to iii) is satisfied, the robot 100 may determine that the first person takes the first posture.

Furthermore, after determining that the first person takes the first posture, the robot 100 may further determine whether the first person does not move for a predetermined time or more. When the first person does not move for the predetermined time or more, the robot 100 may determine the first person to be the person to be rescued.

As described above, in an embodiment, it is possible to determine a posture of a person to be rescued within an image by analyzing the image captured by the camera. It is possible to identify a person to be rescued based on the determined posture.

The technical characteristics described above with reference to FIGS. 1 to 3 may also be applied to FIG. 4 without any change, and thus a redundant description thereof is omitted.

Hereinafter, more detailed examples of the conditions i) to iii) for determining the first posture are described more specifically with reference to FIGS. 7 to 10.

Figure 7:
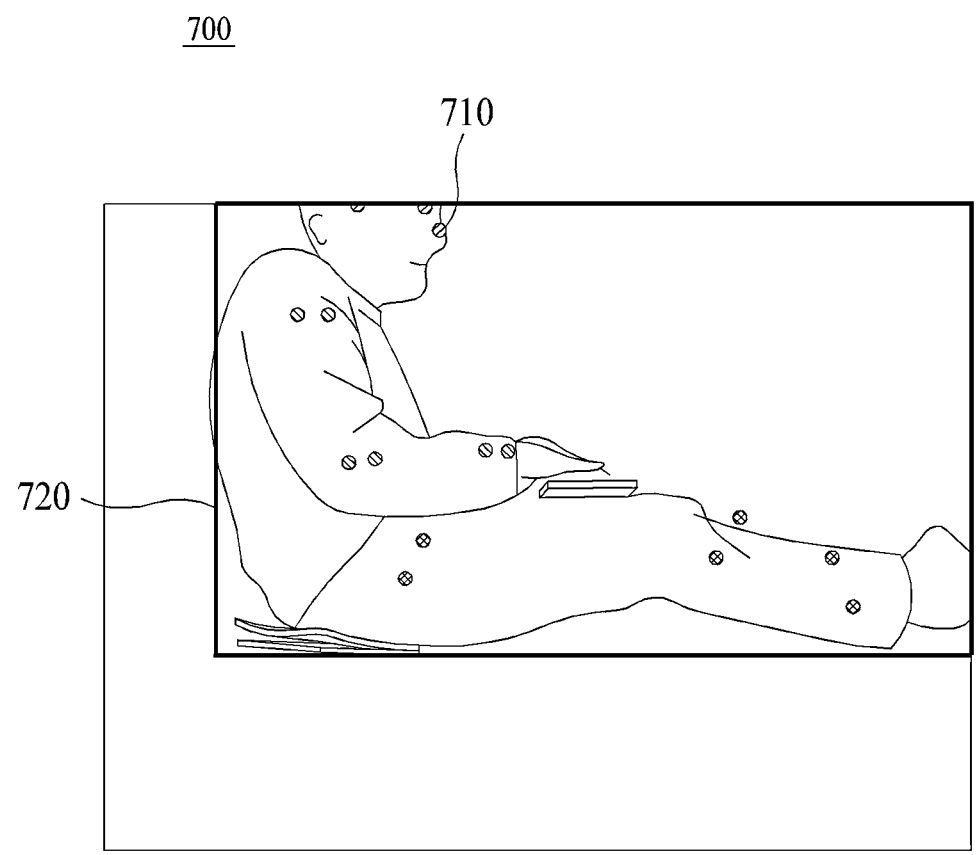
FIG. 7 illustrates a first image (i.e., RGB image) of a recognized person, which is obtained by the camera of the robot, according to an example.
Figure 8:
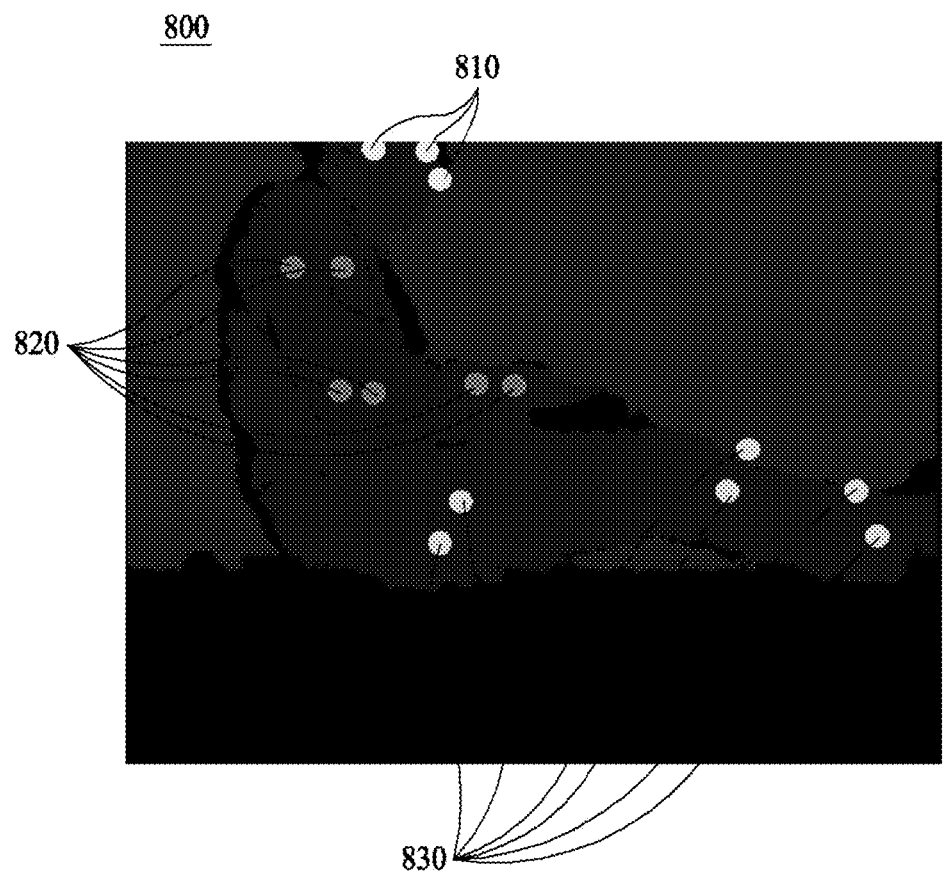
FIG. 8 illustrates a second image (i.e., depth image) of a recognized person, which is obtained by the camera of the robot, according to an example.

FIG. 7 illustrates a first image (i.e., RGB image) of a recognized person, which is obtained by the camera of the robot, according to an example. FIG. 8 illustrates a second image (i.e., depth image) of a recognized person, which is obtained by the camera of the robot, according to an example.

First, a method of extracting key points corresponding to a person and performing key point matching between a first image 700 corresponding to an RGB image and a second image 800 corresponding to a depth image is described more specifically with reference to FIGS. 7 and 8.

The robot 100 may determine a bounding box 720 corresponding to a first person in the first image 700, that is, the RGB image from the RGBD camera. The determining of the bounding box may be performed by using an AI-based algorithm, for example, the YOLO algorithm. The bounding box 720 may be used to determine a posture of the first person corresponding to the condition i).

Furthermore, the robot 100 may extract key points from the first image 700, that is, the RGB image from the RGBD camera. The extracting of the key points may be performed by using an AI-based algorithm, for example, the OpenPose algorithm. Each of the key points may correspond to a part (eyes, a nose, shoulders, hips, or legs) or joint of a recognized person. As illustrated, the key points may be classified based on an area (or part) of the person. For example, the key points may be classified into first key points of an upper body area (e.g., a head or a head+a body area) of the person and second key points of the lower body area of the person. An arrangement pattern of the extracted key points may be used to determine the posture of the first person corresponding to the condition ii).

The second image 800 illustrated in FIG. 8 may be a depth image from the RGBD camera. The robot 100 may match the key points extracted from the first image 700 with the second image 800. In other words, the locations of key points within the depth image, which correspond to the locations of key points within the RGB image, may be calculated. There may be a difference in the resolution between the RGB image, that is, the first image 700, and the depth image, that is, the second image 800. Accordingly, matching may be performed as the coordinates of the key points in the first image 700 are converted into the coordinates of the key points in the second image 800 by considering such a difference in the resolution. The key points extracted from the first image 700 have been matched with the second image 800 illustrated in FIG. 8. In other words, a key point 710 extracted from the first image 700 may correspond to a key point 810 in the second image 800. Similarly, each of the other key points extracted from the first image 700 may correspond to each of the key points 810 to 830 in the second image 800, respectively.

Each of the coordinates in the depth image, that is, the second image 800, may include information on a distance from the camera of the robot 100 to the corresponding coordinate. Accordingly, a distance between the robot 100 and each of the coordinates in the second image 800, which have been converted from the key points in the first image 700, may be determined. In an embodiment, the robot 100 may use the distance to determine a distance between a person to be rescued and the robot 100. 3-D locations (e.g., height values from the ground) of key points (e.g., key points of a head area, or a head+a body area) in the second image 800 may be used to determine the posture of the first person corresponding to the condition iii).

Hereinafter, a method of matching key points extracted from the first image 700 with the second image 800 based on a mathematical concept is described more specifically.

Resolution of the RGB image, that is, the first image 700, may be assumed to be ($W_{rgb}$, $H_{rgb}$), and resolution of the depth image, that is, the second image 800, may be assumed to be ($W_{depth}$, $H_{depth}$). In this case, the coordinates of an arbitrary key point in the first image 700 may be defined as ($Xn_{rgb}$, $Yn_{rgb}$). The coordinates of a key point in the second image 800, which are matched with the coordinates ($Xn_{rgb}$, $Yn_{rgb}$), may be defined as ($Xn_{depth}$, $Yn_{depth}$). The coordinates ($Xn_{depth}$, $Yn_{depth}$) of the key point in the second image 800 may be the coordinates of a key point that includes depth information. In this case, "n" indicative of the number of key points may be a natural number.

The coordinates ($Xn_{depth}$, $Yn_{depth}$) may be calculated by Equation 1.

$$(Xn_{depth}, Yn_{depth}) = \left( \frac{W_{depth} * Xn_{rgb}}{W_{rgb}}, \frac{H_{depth} * Yn_{rgb}}{H_{rgb}} \right) \quad (1)$$

According to Equation 1, the coordinates of the key points in the first image 700 may be converted into the coordinates of the key points in the second image 800, which include distance information, by considering a difference in the resolution between the first image 700 and the second image 800.

The robot 100 may remove key points (i.e., a key point that is erroneously extracted and hereinafter referred to as an outlier) that do not actually correspond to the first person, among key points that have been extracted as corresponding to the first person. For example, the robot 100 may determine a key point(s) including depth information having a difference of a predetermined level or more, compared to the remaining key points, to be an outlier(s) with reference to depth information of each of key points converted into the coordinates of key points in the second image 800. In other words, key points corresponding to the first person may be similar or may have a depth of a predetermined range, but a key point that does not correspond to the first person and that is erroneously extracted may have a depth that falls outside the range. A key point having the greatest depth deviation may be excluded as an outlier.

Such an outlier may be excluded from the key points (i.e., the first key points and the second key points) that are used to determine the posture of the first person. In other words, in step 420 of FIG. 4, when determining the posture of the first person, the robot 100 may match a plurality of key points obtained from the first image 700 with the second image 800 including depth information that is obtained by the camera. The matching may be performed by the conversion of the coordinates. The robot 100 may remove an outlier from the plurality of key points that have been matched with the second image 800. The outlier may be a key point having a deviation of a predetermined level or more compared to the remaining key points, among the plurality of key points matched, with respect to a depth value. Accordingly, key points from which the outlier has been removed, among the plurality of key points obtained from the first image 700, may be used to determine whether the first person corresponds to the first posture.

Each of the key points converted into the coordinates in the second image 800 includes depth information, and may be used to determine the distance between the person to be rescued and the robot 100. For example, the robot 100 may calculate the distance between the robot 100 and the person to be rescued, based on an average of depth values (indicative of distances from the robot 100) of the key points corresponding to the first person that has been identified as a person to be rescued in the second image 800. The key points that are used to determine the average may be all key points in the second image 800, which correspond to the key points extracted from the first image 700, may be key points corresponding to a selected part (e.g., a head, upper body area, or lower body area) of the person to be rescued, among the key points in the second image 800, or may be key points in the second image 800 after an outlier has been removed as described above.

For example, a distance L between the robot 100 and the person to be rescued may be calculated according to Equation 2.

$$L = \frac{1}{n}\sum_{i=0}^{n-1} \text{distance value of depth coordinate } i(Xi_{depth}, Yi_{depth}) \qquad (2)$$

In Equation 2, "n" may indicate the number of key points that are used to determine the average. The determined distance L between the robot 100 and the person to be rescued may be transmitted to the control server 120 as described above with reference to step 330.

Operations, such as the determining of the bounding box 720, the extraction of the key points, the matching of the key points between the first and second images, and the analysis of the images for the determining of the posture, which have been described with reference to FIGS. 7 and 8, may be performed by the robot control system or the control server 120, rather than the robot 100.

Figure 9:
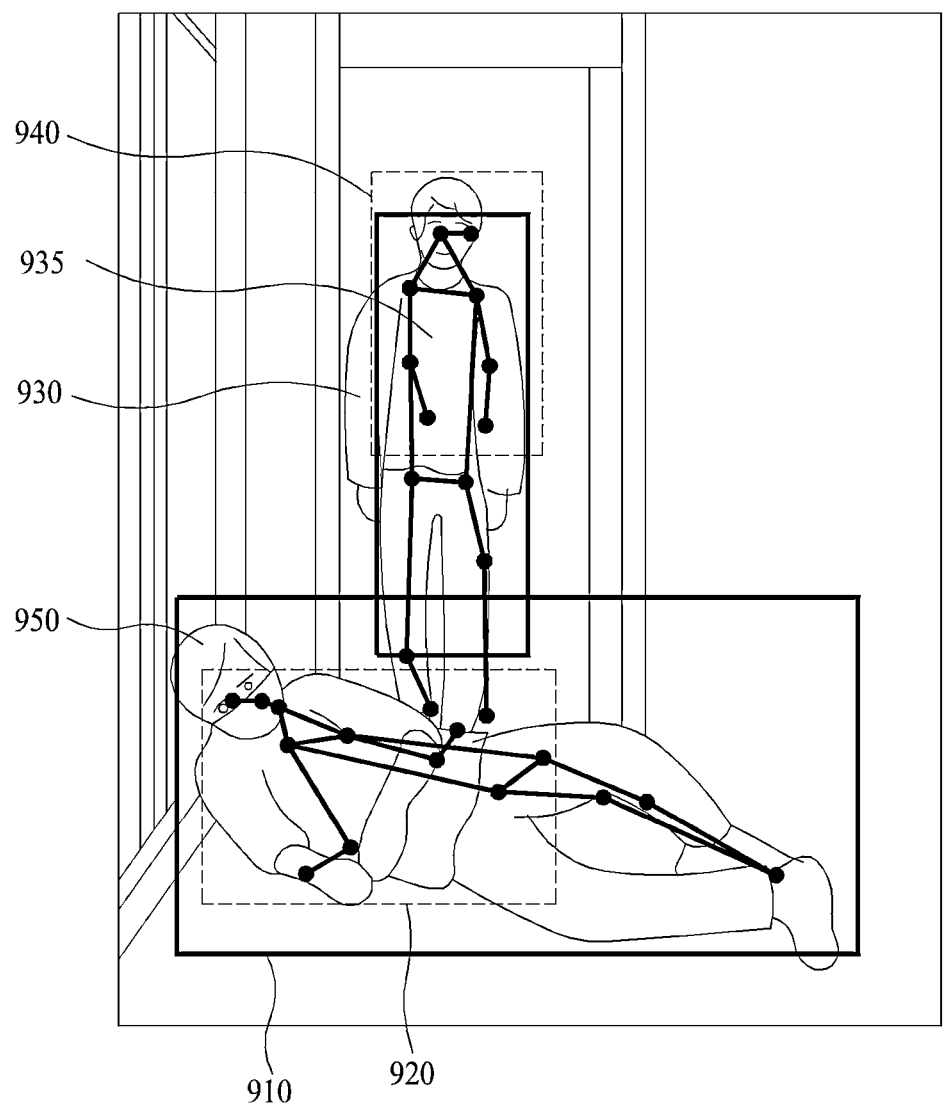
FIG. 9 illustrates a method of identifying a posture of a recognized person in an image that is obtained by the camera of the robot, based on the image, and determining whether the recognized person corresponds to a person to be rescued based on the obtained image, according to an example.

FIG. 9 illustrates a method of identifying a posture of a recognized person in an image that is obtained by the camera of the robot, based on the image, and determining whether the recognized person corresponds to a person to be rescued based on the obtained image, according to an example.

FIG. 9 illustrates an RGB image 900 that is obtained by the camera of the robot 100. A first person 905 and a second person 935 are recognized in the image 900. The robot 100 may determine a first bounding box 910 corresponding to the first person 905 and a second bounding box 930 corresponding to the second person 935. In general, a person who stands up has a characteristic in that a bounding box in which the person is recognized has a shape in which the width of the bounding box is small and the height thereof is great, and a person who has fallen down has a characteristic in that a bounding box in which the person is recognized has a shape in which the width and height of the bounding box are similar or the width is greater than the height. By considering the characteristics, the robot 100 may identify the first person 905 identified to have the first bounding box 910 having a form in which the width of the first bounding box is greater than the height thereof, as a person who has fallen, that is, a person to be rescued (corresponding to the method of determining the posture according to the condition i). Or/additionally, as a condition for identifying a person to be rescued, the robot 100 may further use whether key points of an identified upper body area (e.g., a head or shoulders) are placed at heights that are similar to or smaller than the heights of key points of the remaining lower body area in order to identify a person to be rescued. In other words, the second person 935 having key points 940 that correspond to an upper body area of the second person 935 and that are disposed at high locations may be determined to a person that does not require rescue. The first person 905 having key points 920 that correspond to an upper body area of the first person 905 and that are disposed at locations similar to those of the remaining key points may be determined to be a person to be rescued (corresponding to the method of determining the posture according to the condition ii).

Figure 10:
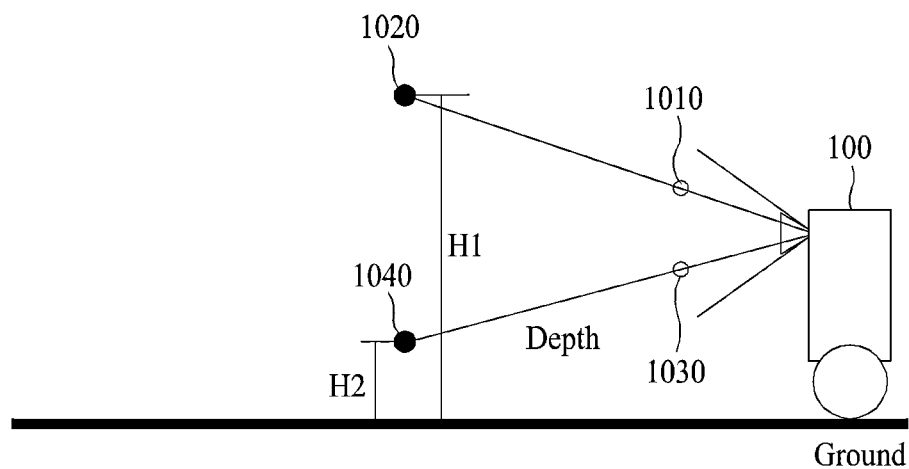
FIG. 10 illustrates a method of determining 3-D locations of key points according to an example.

FIG. 10 illustrates a method of determining 3-D locations of key points according to an example.

As illustrated in FIG. 10, the robot 100 may be aware of the depth of a key point through the camera (indicated as a triangular shape), and thus may determine the height of the key point from the ground. The robot 100 may determine that a third key point 1010 is placed at a height H1 from the ground and that a fourth key point 1030 is placed at a height H2 from the ground, which is lower than the height H1, for example. A third point 1020 may indicate an actual point corresponding to the third key point 1010. A fourth point 1040 may indicate an actual point corresponding to the fourth key point 1030.

When the heights (i.e., an average value of the heights of key points) of key points corresponding to a specific part of a first person, for example, key points corresponding to an upper body area or head area of the first person, from the ground, are a predetermined value or less, the robot 100 may determine that the first person has fallen down and identify the first person as a person to be rescued (corresponding to the method of determining the posture according to the condition iii).

As described above, in an embodiment, the robot 100 can accurately identify whether the first person recognized through the camera by using various methods corresponds to a person to be rescued, can determine a distance between the identified person and the robot 100 based on depth information that is obtained from a depth image, and may transmit the distance to the control server 120.

The aforementioned embodiments have been described centering around the example in which depth information and/or a depth image are obtained by using the RGBD camera. However, depth information and/or a depth image may be obtained by any device capable of obtaining depth information, such as a depth camera that is disposed in the robot 100 or other depth sensor. In this case, the robot 100 does not need to include an RGBD camera, and may be configured to include only an RGB camera, for example. However, the robot 100 according to an embodiment may be configured to LIDAR (or a LIDAR sensor), if necessary.

The technical characteristics described above with reference to FIGS. 1 to 4 may also be applied to FIGS. 7 to 10 without any change, and thus a redundant description thereof is omitted.

Figure 5:
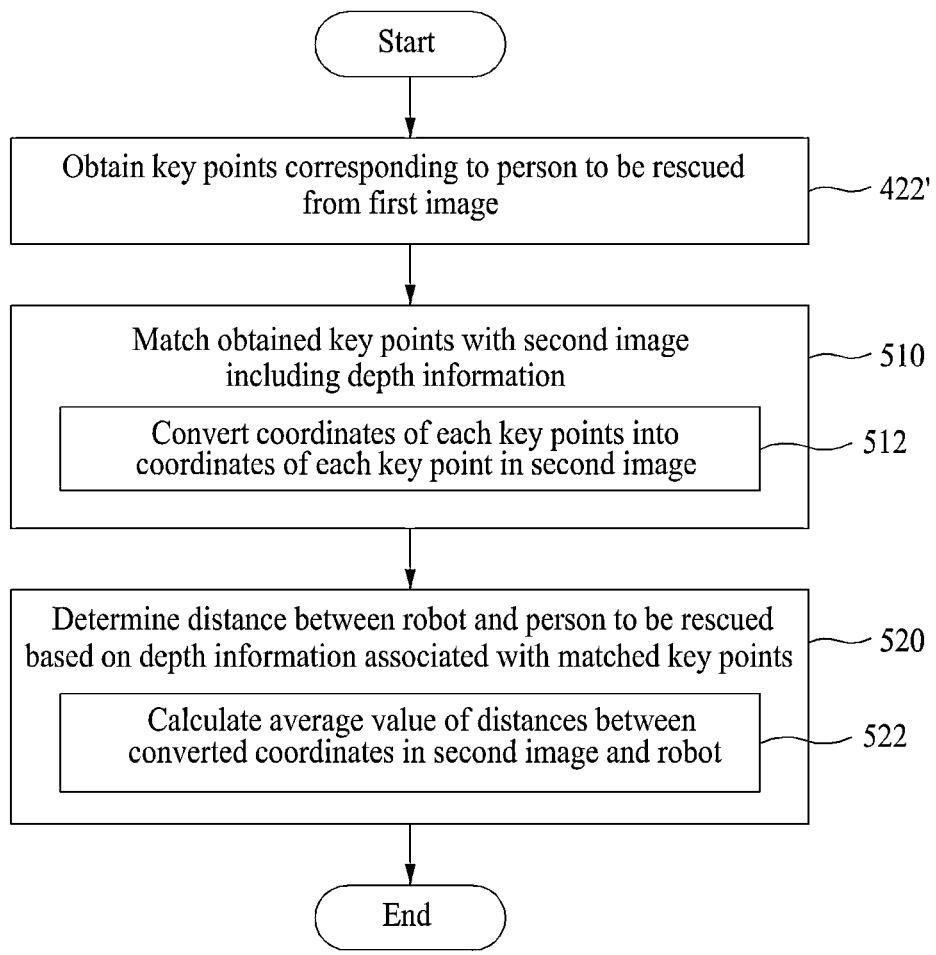
FIG. 5 is a flowchart illustrating a method of determining a distance between the robot that autonomously travels within a space and a person to be rescued, based on information that is obtained by the camera of the robot, according to an example.

FIG. 5 is a flowchart illustrating a method of determining a distance between the robot that autonomously travels within a space and a person to be rescued, based on information that is obtained by the camera of the robot, according to an example.

A method of determining the distance between the robot 100 and the person to be rescued in step 320 is described more specifically with reference to FIG. 5.

In step 422', the robot 100 may obtain a plurality of key points corresponding to the person to be rescued from a first image (e.g., the first image 700, that is, the RGB image captured by the camera). Step 422' may be the same as step 422. In other words, the key points extracted to determine the posture of the person to be rescued for identifying the person to be rescued may also be used to determine the distance between the robot 100 and the person to be rescued. This has been described with reference to FIGS. 7 and 8 and Equations 1 and 2, and thus a redundant description thereof is omitted.

In step 510, the robot 100 may match the plurality of key points obtained in step 422' with a second image (e.g., the second image 800, that is, the depth image) including depth information that is obtained by the camera. The matching of the key points has been described with reference to FIGS. 7 and 8 and Equations 1 and 2, and thus a redundant description thereof is omitted. For example, the first image may have first resolution, and the second image may have second resolution (that is different from the first resolution and lower than the first resolution, in general). In step 512, the robot 100 may convert the coordinates of each of the plurality of key points, which have been obtained in step 422', into the coordinates of each of the plurality of key points in the second image based on the first resolution and the second resolution. The conversion of the coordinates may be performed according to Equation 1.

In step 520, the robot 100 may determine the distance between the robot 100 and the person to be rescued, based on depth information associated with the key points matched with the second image. The determining of the distance between the robot 100 and the person to be rescued may be performed according to Equation 2. In determining the distance based on the depth information, the robot 100 may first remove an outlier from the plurality of key points matched with the second image. Accordingly, key points from which the outlier has been removed, among the plurality of key points matched with the second image, may be used to determine the distance between the robot 100 and the person to be rescued. A method of removing an outlier has been described in detail with reference to FIG. 8, and thus a redundant description thereof is omitted.

In determining the distance between the robot 100 and the person to be rescued, the robot 100 may determine the distance between the robot 100 and the person to be rescued based on an average value of distances between a plurality of key points associated with the person to be rescued and the robot 100, as described in step 522. More specifically, the robot 100 may determine the distance between the robot 100 and the person to be rescued, based on the average value of the distances between the coordinates in the second image, which have been converted from the plurality of key points corresponding to the person to be rescued, and the robot 100. In other words, the robot 100 may calculate the distance between the robot 100 and the person to be rescued, based on an average of depth values (indicative of distances from the robot 100) of the key points corresponding to the first person that has been identified as the person to be rescued in the second image. The calculating of the distance may be performed according to Equation 2.

As described above, in an embodiment, the robot 100 may determine the distance between the person to be rescued and the robot 100 by using the RGB image and the depth image that are captured by the camera. The determined distance may be transmitted to the control server 120, and may be used to generate digital twin content corresponding to a space in which the robot 100 travels.

The technical characteristics described above with reference to FIGS. 1 to 4 and 7 to 10 may also be applied to FIG. 5 without any change, and thus a redundant description thereof is omitted.

Figure 6:
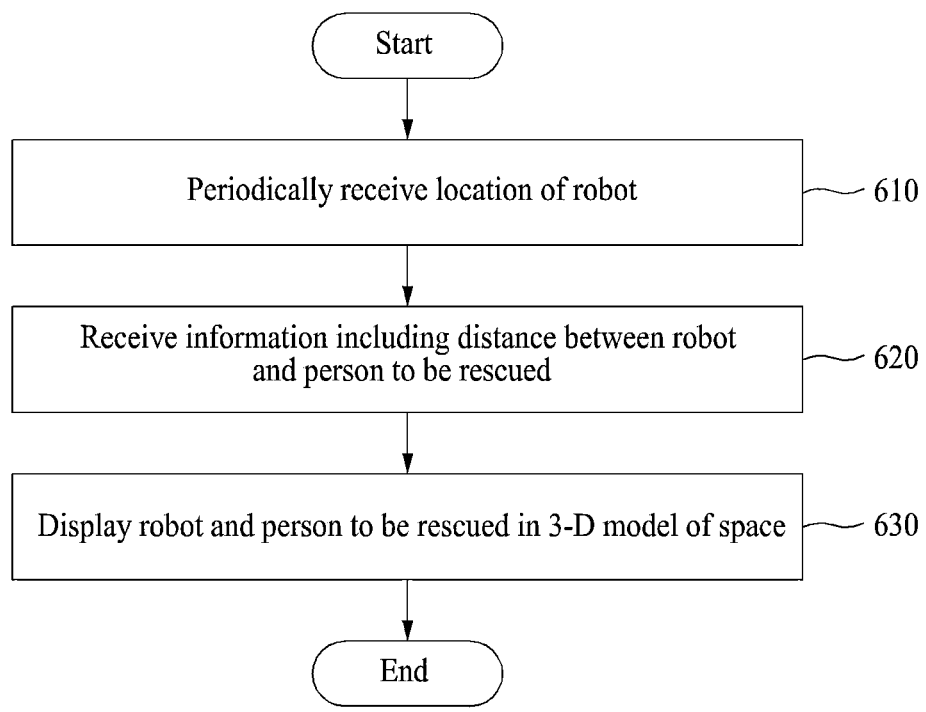
FIG. 6 is a flowchart illustrating a method of generating, by a control server, digital twin content in which the robot and a person to be rescued are displayed in the 3-D model of a space based on location information (and direction information) and distance information that are received from the robot, according to an embodiment.

FIG. 6 is a flowchart illustrating a method of generating, by the control server, digital twin content in which the robot and a person to be rescued are displayed in the 3-D model of a space based on location information (and direction information) and distance information that are received from the robot, according to an embodiment.

Embodiments from a viewpoint of the control server 120 are described more specifically with reference to FIG. 6.

The control server 120 may communicate with at least one robot 100 that travels within a space, and may provide information on the locations of the robot 100 and a person to be rescued through a 3-D model (or digital twin content).

In step 610, the control server 120 may periodically receive the location (and direction) of the robot 100 from the at least one robot 100 that travels within the space. The control server 120 may identify the location (and direction) of the robot 100 (almost) in real time based on the location (or location information) (and direction information) of the robot 100 that are periodically received, and may incorporate the location (or location information) (and direction information) into the 3-D model of the space.

In step 620, the control server 120 may receive, from the robot 100, information including the distance between the robot 100 and the person to be rescued, as information on the person identified by using the camera of the robot 100. The person to be rescued may be a person that has been identified by using the camera of the robot 100, among persons within the space. The distance may be determined based on depth information that is obtained by the camera and that is associated with the person to be rescued. The distance between the robot 100 and the person to be rescued may be determined in the embodiments described with reference to FIGS. 1 to 5 and 7 to 10. The control server 120 may identify the location of the person to be rescued, based on the location (and direction) of the robot 100, which is identified in real time, and the distance between the person to be rescued and the robot 100, and may incorporate the identified location of the person into a 3-D model of the space.

In step 630, the control server 120 may display the robot 100 and the person to be rescued in the 3-D model of the space, based on the location (and direction) of the robot 100 received in step 610 and the information including the distance received in step 620.

The 3-D model may constitute digital twin content corresponding to the space in which the robot 100 travels. The control server 120 may generate the digital twin content, and may render the digital twin content so that the digital twin content is displayed through the control system 200 (i.e., a manager/user terminal).

Figure 11:
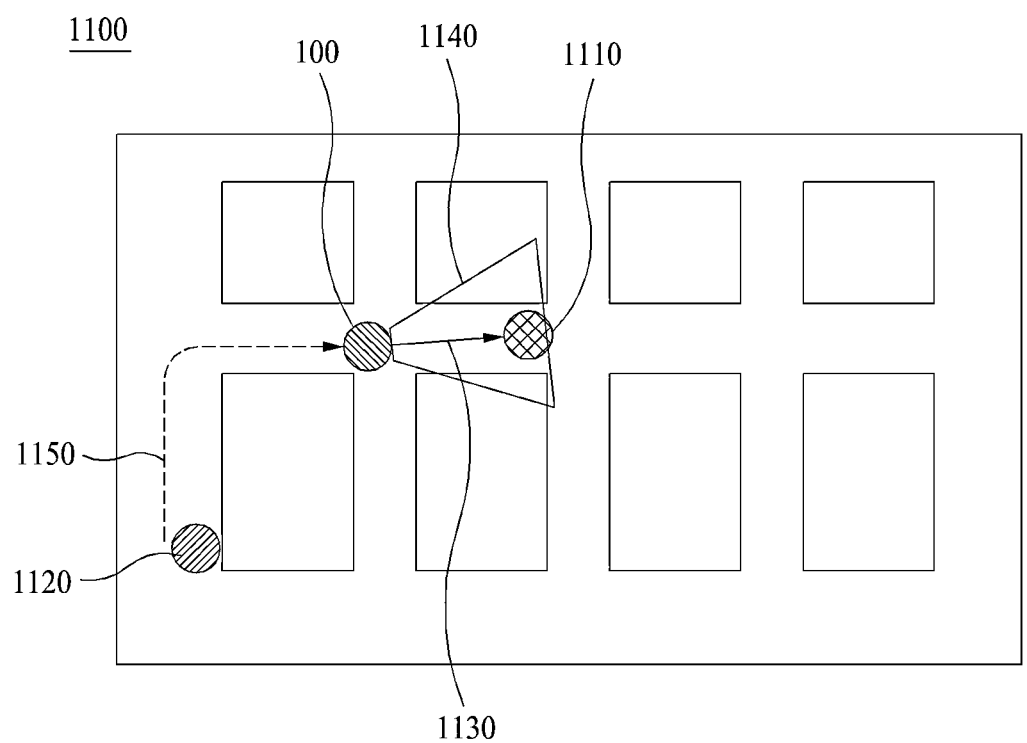
FIG. 11 illustrates a method of displaying the robot and a person to be rescued in the 3-D model of a space in which the robot travels according to an example.

FIG. 11 illustrates an example of the digital twin content.

FIG. 11 illustrates a method of displaying the robot and a person to be rescued in the 3-D model of a space in which the robot travels according to an example.

FIG. 11 illustrates digital twin content 1100 corresponding to a space. The digital twin content 1100 may include at least a first 3-D object 100 that corresponds to the robot 100 and into which a movement of the robot 100 within the space is incorporated and a second 3-D object 1110 corresponding to a person to be rescued.

An area 1140 corresponding to the view angle of the camera of the robot 100 may be further displayed in the digital twin content 1100 in association with the first 3-D object 100 (i.e., the robot 100). Accordingly, a manager/user may intuitively recognize a direction in which the robot 100 views the person to be rescued and the field of view of the robot 100. For example, the robot 100 may periodically transmit, to the control server 120, various types of sensor information related to a posture of the robot 100 or information (e.g., rotation information of the camera and camera parameters) related to control of the camera. The control server 120 may determine the area 1140 corresponding to the view angle of the camera of the robot 100 based on the received information, and may display the area 1140 in the digital twin content 1100. The control server 120 may determine the posture of the robot 100 based on the received information, and may display, in the digital twin content 1100, the first 3-D object 100 that corresponds to the robot 100 and into which the determined posture of the robot 100 is incorporated.

A posture of the person to be rescued may be incorporated into the second 3-D object 1110. For example, when transmitting the information including the distance between the robot 100 and the person to be rescued to the control server 120, the robot 100 may further transmit information on the determined posture of the person to be rescued to the control server 120. The control server 120 may construct the second 3-D object 1110 based on the received information so that the posture of the person to be rescued is incorporated into the second 3-D object 1110, and may display the second 3-D object 1110 in the digital twin content 1100. The control server 120 is aware of the location and posture (or direction) of the robot 100. Accordingly, the control server 120 can display the second 3-D object 1110, corresponding to the person to be rescued, at an accurate location corresponding to an actual location of the person to be rescued in the digital twin content 1100, based on the received distance information.

Furthermore, a moving path 1150 of the robot 100 may be represented in the digital twin content 1100. Accordingly, a manager/user can intuitively recognize a moving trajectory of the robot 100.

Furthermore, the digital twin content 1100 may further display a graphic 1130 indicative of a distance between the robot 100 and the person 1110 to be rescued.

Furthermore, the digital twin content 1100 may further display another facility or property 1120 (e.g., a charging station for the robot 100) within the space in addition to the robot 100 and the person 1110 to be rescued. The facility or property 1120 may also be represented in the digital twin content 1100 as a 3-D object. For reference, a specific facility or property, such as a charging station, may become a criterion that is used for the robot 100 to determine a location (and direction).

The technical characteristics described above with reference to FIGS. 1 to 5 and 7 to 10 may also be applied to FIGS. 6 and 11 without any change, and thus a redundant description thereof is omitted.

Figure 12:
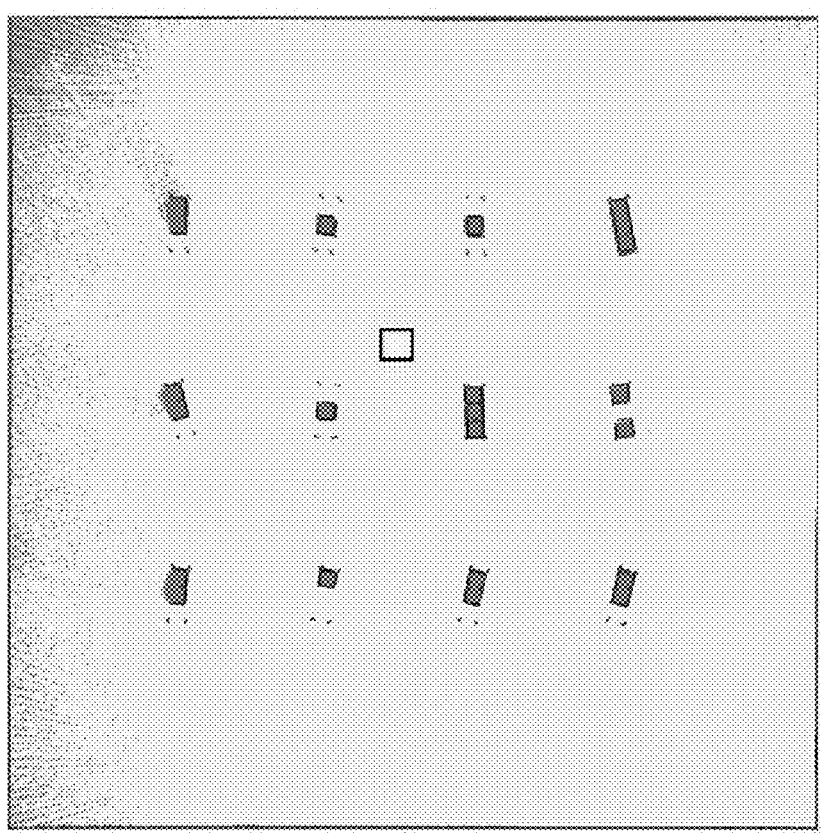
FIG. 12 illustrates the location of the robot in a two-dimensional (2-D) map according to an example.
Figure 13:
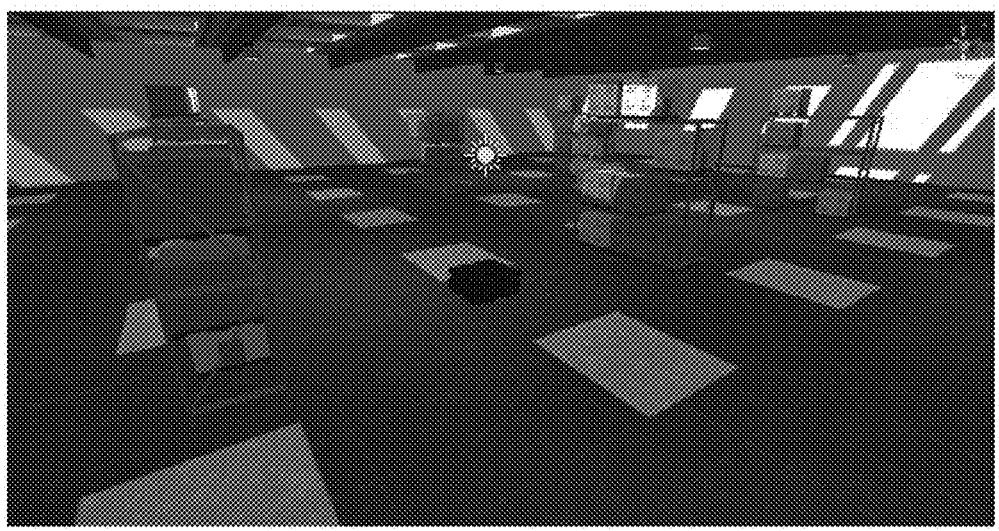
FIG. 13 illustrates that the location of the robot in the 2-D map is converted into coordinates in a 3-D space according to an example.

FIG. 12 illustrates the location of the robot in a two-dimensional (2-D) map according to an example. FIG. 13 illustrates that the location of the robot in the 2-D map is converted into coordinates in a 3-D space according to an example.

As illustrated in FIG. 12, location information of the robot 100 may be managed in the 2-D map. That is, the location of the robot 100 may be represented in a 2-D map 1200.

2-D location information from the robot 100 may be converted into 3-D coordinates (i.e., coordinates in a space-based coordinate system). The converted 3-D coordinates may be represented in a 3-D space 1300 through the control system 200.

The control server 120 may perform a task for converting the 2-D location information of the robot 100 into the coordinates of the 3-D space-based coordinate system. For example, the control server 120 may determine the location of the robot 100 in the 3-D space 1300 based on the 2-D location information from the robot 100 and sensor information (e.g., information on the posture of the robot 100) that is obtained by sensing the space. A 3-D object corresponding to the robot 100 may be represented at the determined location in the 3-D space 1300.

The technical characteristics described above with reference to FIGS. 1 to 11 may also be applied to FIGS. 12 and 13 without any change, and thus a redundant description thereof is omitted.

In another embodiment, in recognizing a person or a person to be rescued by using the camera, the robot 100 may further check a moving speed of the recognized person or the recognized person to be rescued, based on a change in depth information that is obtained by the camera. The robot 100 may identify a person who moves at a speed less than a predetermined speed as a person to be rescued. Alternatively, according to an embodiment, the robot 100 may identify a person who moves at a speed more than a predetermined speed as a specific person (e.g., a person on the blacklist) that needs to be monitored by the control server 120. The identified person on the blacklist may also be represented in the digital twin content 1100 as a 3-D object.

The aforementioned device may be implemented as a hardware component, a software component, and/or a combination of a hardware component and a software component. For example, the device and component described in the embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, component, physical device, virtual machine, or computer storage medium or device, or a transmitted signal wave permanently or temporarily, in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means, and may be stored in a computer-readable medium. The computer-readable recording medium may include a program instruction, a data file, and a data structure alone or in combination. The program instruction recorded on the medium may be specially designed and constructed for an embodiment, or may be known and available to those skilled in the computer software field. Examples of the computer-readable recording medium include magnetic media such as a hard disk, a floppy disk, and a magnetic tape, optical media such as CD-ROM and a DVD, magneto-optical media such as a floptical disk, and hardware devices specially configured to store and execute a program instruction, such as ROM, RAM, and flash memory. Examples of the program instruction include not only machine language code produced by a compiler, but a high-level language code which may be executed by a computer using an interpreter, etc. The hardware device may be configured to operate as one or more software modules in order to perform an operation according to an embodiment, and vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

The invention claimed is:

1. A method of controlling a robot, the method performed by the robot that travels within a space comprising:
    identifying a person to be rescued, among persons within the space, by using a camera of the robot while travelling within the space;
    determining a distance between the robot and the person to be rescued based on depth information that is obtained by the camera and that is associated with the person to be rescued; and
    transmitting information comprising the distance to a control server for the space,
    wherein the method further comprises periodically transmitting a location of the robot to the control server,
    wherein the control server displays the received location of the robot in a three-dimensional (3-D) model of the space, and
    further displays the person to be rescued based on the received location of the robot and the received distance, and
    wherein the 3-D model constitutes digital twin content corresponding to the space, and
    the digital twin content comprises at least a first 3-D object that corresponds to the robot and into which a movement of the robot is incorporated and a second 3-D object corresponding to the person to be rescued.

2. The method of claim 1, wherein the camera comprises an RGBD camera.

3. The method of claim 1, wherein the identifying of the person to be rescued comprises:
    identifying a first person within the space by using the camera;
    determining a posture of the first person; and
    determining the first person as the person to be rescued when the posture of the first person corresponds to a first posture that requires rescue.

4. The method of claim 3, wherein the determining of the posture of the first person comprises:
    obtaining a bounding box and a plurality of key points corresponding to the first person from a first image that is captured by the camera; and
    determining whether the first posture corresponds to the first person based on at least one of a shape of the bounding box and an arrangement pattern of the key points.

5. The method of claim 4, wherein the determining of whether the first posture corresponding to the first person comprises determining that the first person corresponds to the first posture when the shape of the bounding box is a rectangular shape having a width greater than a height or a ratio of a horizontal length to vertical length of the bounding box is a predetermined value or more.

6. The method of claim 4, wherein the determining of whether the first posture corresponds to the first person comprises determining that the first posture corresponds to the first person, when the key points indicate an arrangement pattern in which first key points corresponding to an upper body area of the first person, among the key points, are disposed at locations identical with or lower than locations of second key points corresponding to a lower body area of the first person from a ground.

7. The method of claim 4, wherein the determining of whether the first posture corresponds to the first person comprises determining that the first person corresponds to the first posture, when heights of first key points corresponds to an upper body area of the first person from a ground is a predetermined value or less.

8. The method of claim 4, wherein the determining of the posture of the first person comprises:
    matching the plurality of key points with a second image comprising the depth information obtained by the camera; and
    removing an outlier from the plurality of key points matched with the second image,
    wherein key points from which the outlier has been removed, among the plurality of key points, are used to determine whether the first person corresponds to the first posture.

9. The method of claim 1, wherein the determining of the distance comprises:
    obtaining a plurality of key points corresponding to the person to be rescued from a first image that is captured by the camera;
    matching the plurality of key points with a second image comprising the depth information that is obtained by the camera; and
    determining the distance based on depth information associated with the plurality of key points matched with the second image.

10. The method of claim 9, wherein:
    the determining of the distance based on the depth information comprises removing an outlier from the plurality of key points matched with the second image, and
    key points from which the outlier has been removed, among the plurality of key points, are used to determine the distance.

11. The method of claim 9, wherein the determining of the distance comprises determining the distance based on an average value of distances between the plurality of key points and the robot.

12. The method of claim 9, wherein:
    the first image has first resolution,
    the second image has second resolution, and
    the matching of the plurality of key points with the second image comprises converting coordinates of each of the plurality of key points into coordinates in the second image based on the first resolution and the second resolution.

13. The method of claim 12, wherein the determining of the distance based on the depth information comprises determining the distance based on an average value of distances between the coordinates in the second image, which have been converted from the plurality of key points, and the robot.

14. A robot that travels within a space, the robot comprising:
    at least one processor configured to execute a computer-readable instruction;
    a communication unit; and
    a camera,
    wherein the at least one processor identifies a person to be rescued, among persons within the space, by using the camera while travelling within the space, determines a distance between the robot and the person to be rescued based on depth information that is obtained by the camera and that is associated with the person to be rescued, transmits information comprising the distance to a control server for the space through the communication unit, and further periodically transmits a location of the robot to the control server, wherein, by the control server, the received location of the robot is displayed in a three-dimensional (3-D) model of the space, and the person to be rescued based on the received location of the robot and the received distance is further displayed in the three-dimensional (3-D) model of the space, and wherein the 3-D model constitutes digital twin content corresponding to the space, and the digital twin content comprises at least a first 3-D object that corresponds to the robot and into which a movement of the robot is incorporated and a second 3-D object corresponding to the person to be rescued.

15. A method of providing information on a person to be rescued within a space, the method performed by a control server that communicates with at least one robot that travels within the space comprising:

periodically receiving a location of the at least one robot from the robot that travels within the space;

receiving, from the robot, information comprising a distance between the robot and the person to be rescued as information on the person to be rescued, which is identified by using a camera of the robot; and displaying the robot and the person to be rescued in a three-dimensional (3-D) model of the space based on the received location of the robot and the received information, wherein the person to be rescued is a person identified by the camera of the robot, among persons within the space, and the distance is determined based on depth information that is obtained by the camera and that is associated with the person to be rescued, wherein the 3-D model constitutes digital twin content corresponding to the space, and the digital twin content comprises at least a first 3-D object that corresponds to the robot and into which a movement of the robot is incorporated and a second 3-D object corresponding to the person to be rescued.

16. The method of claim 15, wherein the digital twin content is configured to further display an area corresponding to a view angle of the camera of the robot in association with the robot.

* * * * *